US012682235B2

(12) United States Patent
Kalita et al.

(10) Patent No.: US 12,682,235 B2
(45) Date of Patent: Jul. 14, 2026

(54) METHOD AND SYSTEM FOR IDENTIFYING HIERARCHICAL RELATIONSHIPS BETWEEN DATA ELEMENTS OF DOCUMENT

(71) Applicant: Quantiphi, Inc, Marlborough, MA (US)

(72) Inventors: Bhaskar Kalita, Marlborough, MA (US); Karthik Kumar Veldandi, Mumbai (IN); Jeevan Prakash, Mumbai (IN); Alok Kumar Garg, Mumbai (IN); Sagar Kewalramani, Toronto (CA)

(73) Assignee: Quantiphi Inc., Marlborough, MA (US)

( * ) Notice: Subject to any disclaimer, the term of this patent is extended or adjusted under 35 U.S.C. 154(b) by 676 days.

(21) Appl. No.: 18/187,474

(22) Filed: Mar. 21, 2023

(65) Prior Publication Data

US 2024/0320483 A1     Sep. 26, 2024

(51) Int. Cl.
| | |
|---|---|
| G06N 3/08 | (2023.01) |
| G06F 16/93 | (2019.01) |
| G06F 40/103 | (2020.01) |
| G06F 40/279 | (2020.01) |

(52) U.S. Cl.
CPC .............. G06N 3/08 (2013.01); G06F 16/93 (2019.01); G06F 40/103 (2020.01); G06F 40/279 (2020.01)

(58) Field of Classification Search
None
See application file for complete search history.

(56) References Cited

U.S. PATENT DOCUMENTS

| | | | |
|---|---|---|---|
| 6,560,620 B1 * | 5/2003 | Ching ................. | G06V 30/416 |
| | | | 707/999.203 |
| 2017/0109610 A1 * | 4/2017 | Macciola ............... | G06F 16/93 |

OTHER PUBLICATIONS

Jaume, Guillaume, Hazim Kemal Ekenel, and Jean-Philippe Thiran. "Funsd: A dataset for form understanding in noisy scanned documents." 2019 International Conference on Document Analysis and Recognition Workshops (ICDARW). vol. 2. IEEE (Year: 2019).*

(Continued)

*Primary Examiner* — Shahid K Khan

(74) *Attorney, Agent, or Firm* — RC Trademark Company

(57) ABSTRACT

Disclosed is a method for identifying multi-level hierarchical relationships between data elements of a document, the method comprising receiving a plurality of sample documents each having a plurality of data elements arranged in a multi-level hierarchical data structure; classifying each of the plurality of data elements into a key entity field or a key field value based on a hierarchical relationship therebetween; identifying key entity fields, from among the classified key entity field of the plurality of data elements, having the hierarchical relationship therebetween; pairing the key entity field, with a corresponding key field value or an identified key entity field, to form a training dataset; and employing the training dataset on a neural network framework, having at least one of a textual modality or a visual modality, to identify the multi-level hierarchical relationships between the data elements of the document.

20 Claims, 2 Drawing Sheets

RECEIVE SAMPLE DOCUMENTS EACH HAVING DATA ELEMENTS ARRANGED IN MULTI-LEVEL HIERARCHICAL DATA STRUCTURE
102

CLASSIFY EACH OF DATA ELEMENTS INTO KEY ENTITY FIELD OR KEY FIELD VALUE BASED ON HIERARCHICAL RELATIONSHIP THEREBETWEEN
104

IDENTIFY KEY ENTITY FIELDS, FROM AMONG CLASSIFIED KEY ENTITY FIELD OF DATA ELEMENTS, HAVING HIERARCHICAL RELATIONSHIP THEREBETWEEN
106

PAIR KEY ENTITY FIELD, WITH CORRESPONDING KEY FIELD VALUE OR IDENTIFIED KEY ENTITY FIELD, TO FORM TRAINING DATASET
108

EMPLOY TRAINING DATASET ON NEURAL NETWORK FRAMEWORK HAVING ONE OF TEXTUAL MODALITY OR VISUAL MODALITY
110

(56) References Cited

OTHER PUBLICATIONS

Wang, Zilong, et al. "Docstruct: A multimodal method to extract hierarchy structure in document for general form understanding." arXiv preprint arXiv:2010.11685 (Year: 2020).*

Shere, Rohit Prakash, Pavan Kumar Chittimalli, and Ravindra Naik. "Identifying and Extracting Hierarchical Information from Business PDF Documents." Proceedings of the 15th Innovations in Software Engineering Conference (Year: 2022).*

Villota, María, et al. "Text classification models for form entity linking." International Symposium on Distributed Computing and Artificial Intelligence. Cham: Springer International Publishing (Year: 2022).*

Hu, Kai, et al. "A question-answering approach to key value pair extraction from form-like document images." Proceedings of the AAAI Conference on Artificial Intelligence. vol. 37. No. 11. 2023 (Year: 2023).*

Xu, Yiheng, et al. "Layoutlm: Pre-training of text and layout for document image understanding." Proceedings of the 26th ACM Sigkdd international conference on knowledge discovery & data mining. 2020 (Year: 2020).*

Mathur, Puneet, et al. "LayerDoc: layer-wise extraction of spatial hierarchical structure in visually-rich documents." Proceedings of the IEEE/CVF Winter Conference on Applications of Computer Vision. 2023 (Year: 2023).*

Davis, Brian, et al. "Deep visual template-free form parsing." 2019 International Conference on Document Analysis and Recognition (ICDAR). IEEE, 2019 (Year: 2019).*

Carbonell, Manuel, et al. "Named entity recognition and relation extraction with graph neural networks in semi structured documents" 2020 25th International Conference on Pattern Recognition (ICPR). IEEE, 2021 (Year: 2021).*

Prabhu, Nishant, Hiteshi Jain, and Abhishek Tripathi. "Mtl-foun: A multi-task learning approach to form understanding." International Conference on Document Analysis and Recognition. Cham: Springer International Publishing, 2021 (Year: 2021).*

Shere, Rohit Prakash, Pavan Kumar Chittimalli, and Ravindra Naik. "Identifying and Extracting Hierarchical Information from Business PDF Documents." Proceedings of the 15th Innovations in Software Engineering Conference. 2022 (Year: 2022).*

Davis, Brian, et al. "Visual fudge: Form understanding via dynamic graph editing." International Conference on Document Analysis and Recognition. Cham: Springer International Publishing, 2021 (Year: 2021).*

* cited by examiner

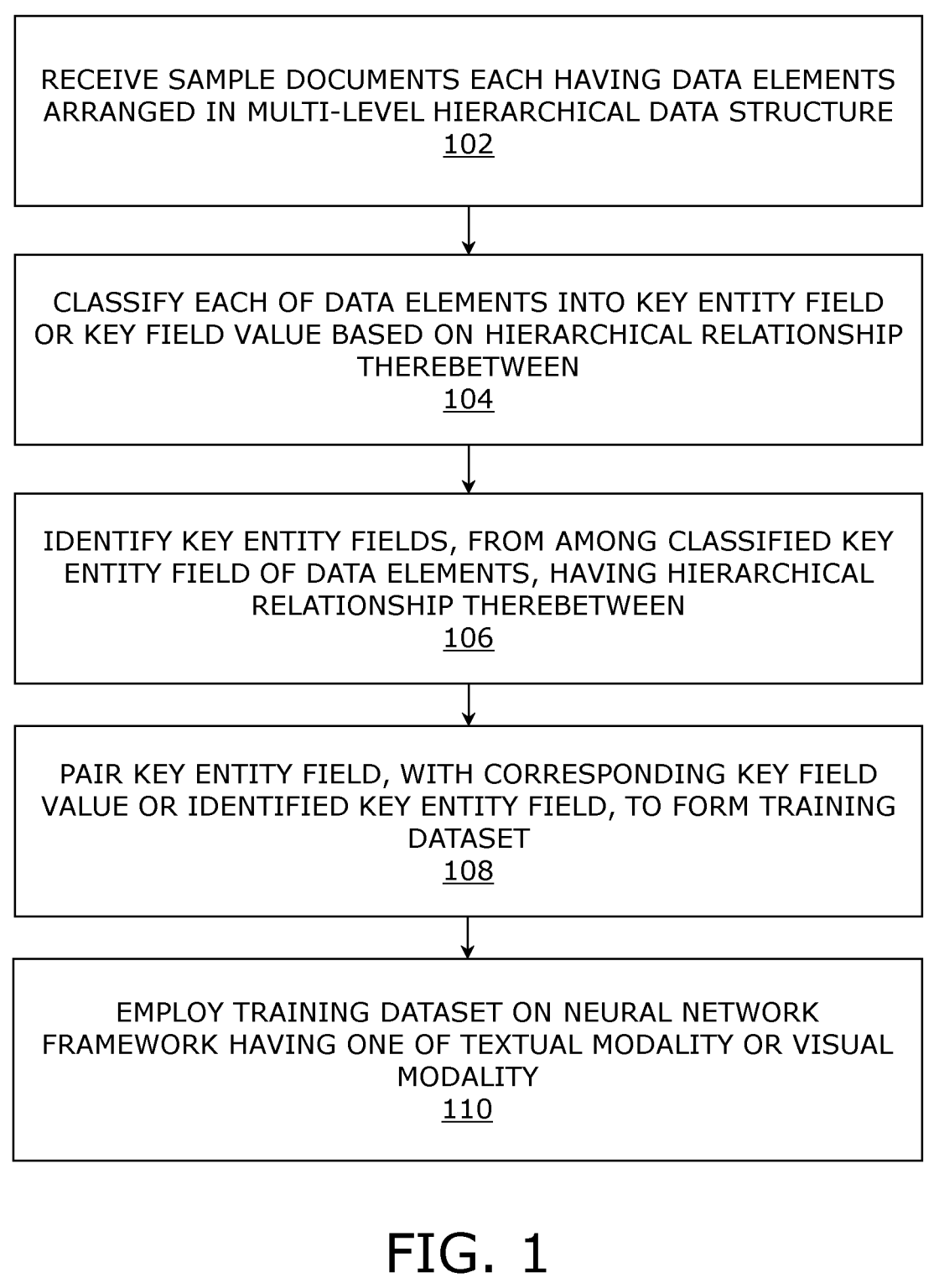

RECEIVE SAMPLE DOCUMENTS EACH HAVING DATA ELEMENTS ARRANGED IN MULTI-LEVEL HIERARCHICAL DATA STRUCTURE
102

CLASSIFY EACH OF DATA ELEMENTS INTO KEY ENTITY FIELD OR KEY FIELD VALUE BASED ON HIERARCHICAL RELATIONSHIP THEREBETWEEN
104

IDENTIFY KEY ENTITY FIELDS, FROM AMONG CLASSIFIED KEY ENTITY FIELD OF DATA ELEMENTS, HAVING HIERARCHICAL RELATIONSHIP THEREBETWEEN
106

PAIR KEY ENTITY FIELD, WITH CORRESPONDING KEY FIELD VALUE OR IDENTIFIED KEY ENTITY FIELD, TO FORM TRAINING DATASET
108

EMPLOY TRAINING DATASET ON NEURAL NETWORK FRAMEWORK HAVING ONE OF TEXTUAL MODALITY OR VISUAL MODALITY
110

FIG. 1

METHOD AND SYSTEM FOR IDENTIFYING HIERARCHICAL RELATIONSHIPS BETWEEN DATA ELEMENTS OF DOCUMENT

TECHNICAL FIELD

The present disclosure generally relates to a hierarchy extraction model. Specifically, the present disclosure relates to methods and systems for identifying hierarchical relationships between data elements of a document.

BACKGROUND

Analysis and extraction of information provided in a document is crucial for several businesses, such as insurance companies, mortgage landing companies, financial institutions, or similar. The information may be provided in a document in a semi-structured manner or an unstructured manner, which makes it difficult to analyze the information in the document and compare the information from one document to another document. Further, the document contains multiple entity fields linked to each other directly or as a set of entity fields hierarchically linked to each other as a nested tree. An accurate and optimal extraction of the hierarchy between the entity fields is critical to be identified for comprehension and analysis of the document.

However, conventional solutions available for extraction of the information in the document are suboptimal. As an example, the conventional solution may include language processing models. The language processing models are unable to extract multi-level hierarchical relationships between the entity fields represented as the nested tree in the document. Further, the conventional solutions are time consuming and cause overburdening on computing resources.

Therefore, in light of the foregoing discussion, there exists a need to overcome the aforementioned drawbacks associated with extraction of hierarchically linked information of the document and provide an improved method and system for identifying hierarchical relationships between data elements of a document. The present disclosure provides a method and a system for training a neural network for extracting the multi-level hierarchical relationship between data elements of a document.

SUMMARY

The present disclosure seeks to provide a method for identifying hierarchical relationships between data elements of a document. The present disclosure also seeks to provide a system for identifying hierarchical relationships between data elements of a document. An aim of the present disclosure is to provide a solution that overcomes at least partially the problems encountered in prior art.

In one aspect, an embodiment of the present disclosure provides a method for identifying multi-level hierarchical relationships between data elements of a document, the method comprising:

receiving a plurality of sample documents each having a plurality of data elements arranged in a multi-level hierarchical data structure;

classifying each of the plurality of data elements into a key entity field or a key field value based on a hierarchical relationship therebetween;

identifying key entity fields, from among the classified key entity field of the plurality of data elements, having the hierarchical relationship therebetween;

pairing the key entity field, with a corresponding key field value or an identified key entity field, to form a training dataset; and employing the training dataset on a neural network framework, having at least one of a textual modality or a visual modality, to identify the multi-level hierarchical relationships between the data elements of the document.

In another aspect, an embodiment of the present disclosure provides a system for identifying multi-level hierarchical relationships between data elements of a document, the system comprising at least one processor configured to:

receive a plurality of sample documents each having a plurality of data elements arranged in a multi-level hierarchical data structure;

classify each of the plurality of data elements into a key entity field or a key field value based on a hierarchical relationship therebetween;

identify key entity fields, from among the classified key entity field of the plurality of data elements, having the hierarchical relationship therebetween;

pair the key entity field, with a corresponding key field value or an identified key entity field, based on the hierarchical relationship therebetween to form a training dataset; and employ the training dataset on a neural network framework, having at least one of a textual modality or a visual modality, to identify the multi-level hierarchical relationships between the data elements of the document.

Embodiments of the present disclosure substantially eliminate or at least partially address the aforementioned problems in the prior art, and enable accurate extraction of the multi-level hierarchical relationships amongst the plurality of data elements in the document.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 1 illustrates steps of a method for identifying hierarchical relationships between data elements of a document, in accordance with an embodiment of the present disclosure;

Figure 2:
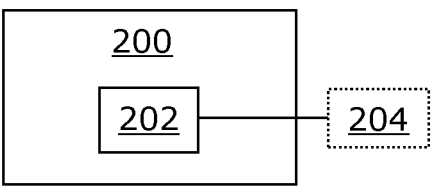
FIG. 2 illustrates a block diagram of an architecture of a system for identifying hierarchical relationships between data elements of a document, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for identifying multi-level hierarchical relationships between data elements of a document, the method comprising:

receiving a plurality of sample documents each having a plurality of data elements arranged in a multi-level hierarchical data structure;

classifying each of the plurality of data elements into a key entity field or a key field value based on a hierarchical relationship therebetween;

identifying key entity fields, from among the classified key entity field of the plurality of data elements, having the hierarchical relationship therebetween;

pairing the key entity field, with a corresponding key field value or an identified key entity field, to form a training dataset; and employing the training dataset on a neural network framework, having at least one of a textual modality or a visual modality, to identify the multi-level hierarchical relationships between the data elements of the document.

In another aspect, an embodiment of the present disclosure provides a system for identifying multi-level hierarchical relationships between data elements of a document, the system comprising at least one processor configured to:

receive a plurality of sample documents each having a plurality of data elements arranged in a multi-level hierarchical data structure;

classify each of the plurality of data elements into a key entity field or a key field value based on a hierarchical relationship therebetween;

identify key entity fields, from among the classified key entity field of the plurality of data elements, having the hierarchical relationship therebetween;

pair the key entity field, with a corresponding key field value or an identified key entity field, based on the hierarchical relationship therebetween to form a training dataset; and employ the training dataset on a neural network framework, having at least one of a textual modality or a visual modality, to identify the multi-level hierarchical relationships between the data elements of the document.

The present disclosure provides the aforementioned method and system for identifying multi-level hierarchical relationships between data elements of the document.

Advantageously, the method of the present disclosure follows multimodal approach (i.e., considers the textual modality and the visual modality of the training dataset), thereby enabling more accurate extraction of the multi-level hierarchical relationship between the data elements arranged as the dynamic nested tree in the document. Beneficially, extraction of the multi-level hierarchy in the document imparts a significant ease to businesses by reducing manual effort required in comprehension and comparison of the document. More beneficially, extraction of the multi-level hierarchical relationships amongst the plurality of data elements results in accurate capturing and storage of the key entity fields and key field values in a database which can be utilized later. Additionally, the method is cost effective and does not cause overburdening of computing resources. Moreover, the system is inexpensive, reliable and can be implemented and used with ease.

Optionally, the plurality of sample documents are received from a data source. Example of the data source could be a data repository. It will be appreciated that the data repository could be implemented, for example, such as a memory of the at least one processor, a memory of a computing device communicably coupled to the at least one processor, a removable memory, a cloud-based database, or similar. Examples of the computing device include, but are not limited to, a laptop, a desktop, a tablet, a phablet, and a workstation. Optionally, the plurality of sample documents are received in a form of portable document format (PDF).

The term "data element" as used herein refers to individual pieces of information that are included in a given sample document. The plurality of data elements may include, but are not limited to, text fields, value fields, and check boxes. Optionally, the term "document" encompasses various types of documents such as, but are not limited to, policy documents, commercial insurance document, mortgage landing documents, banking documents.

Notably, the plurality of data elements in the given sample document are arranged in the multi-level hierarchical data structure. The term "hierarchical data structure" as used herein refers to a hierarchical arrangement of the plurality of data elements in the document. The multi-level hierarchical data structure is used to organize and arrange the plurality of data elements in a structural and a logical manner. As an example, the plurality of data elements may be arranged as at least one heading and multiple subheadings below the at least one heading which are indented to a fixed position with respect to the at least one heading in the given sample document.

Optionally, the multi-level hierarchical data structure is a dynamic nested tree, wherein the dynamic nested tree comprises one or more levels of hierarchy for one or more key entity fields, and wherein each of the one or more key entity fields hierarchically concludes with a corresponding key field value. In this regard, the term "dynamic nested tree" refers to an arrangement of the plurality of data elements in the given sample document. Optionally, the plurality of data elements are arranged in a hierarchical manner which is intuitive to human perception. In the dynamic nested tree, the plurality of data elements has one or more levels of nesting. It will be noted that one level of nesting represents one pair of a parent and at least one child. Optionally, a number of the one or more levels of nesting may vary form one sample document to another sample document. As an example, a policy document of one company may have three levels of nesting. As another example, a policy document of another company may have four levels of nesting, and so on. Optionally, in the dynamic nested tree, the one or more data elements at a higher level represents a broader category and one or more data elements at a lower level represents more specific sub-categories or details belonging to the broader category. Advantageously, the technical effect of the dynamic nested tree is that the plurality of data elements can be arranged in a logical manner which can be navigated easily.

Notably, the plurality of data elements are classified into the key entity field or the key field value based on the hierarchical relationship between them. In this regard, the plurality of data elements may be divided into two parts. The "key entity field" refers to specific information provided in the given sample document. The "key field value" refers to a corresponding value of the key entity field provided in the given sample document. The key entity field is inferred as a parent and the corresponding key field value is inferred as the child. Optionally, a number of the key entity field and the key field value is same. As an example, the given sample document may include ten key entity fields and corresponding ten key field values.

Optionally, the key entity field comprises one of alphabetical characters or alphanumeric characters, and wherein the key field value comprises alphabetical characters, numerical characters or alphanumeric characters. In this regard, optionally, the key entity field comprises the alphabetic characters. As an example, one of the key entity fields in a policy document may be referred to as policy number. Optionally, the key entity field comprises the alphanumeric characters. Optionally, in one implementation, the key entity value comprises alphabetical characters. As an example, the key entity field may be name insured and corresponding key field value may be name of a person insured. In another implementation, the key field comprises numerical characters. As an example, the key entity field may be coverage period and the corresponding key field value may be a date. In yet another example, the key entity field may be policy number and the corresponding key field value may be XYZ123.

Optionally, the key entity field is extracted from the document by:

defining a set of primary data elements, and comparing the plurality of data elements with each of the set of primary data elements to extract the key entity field.

In this regard, the term "primary data elements" refers to a set of data elements which represent information present in a given sample document. Optionally, the neural network framework is trained for multiple primary data elements. Optionally, the primary data elements are different for different documents. As an example, the primary data elements in the policy document may be different than the primary data elements in a banking document. As a first example, in a policy document, the primary data elements may include, but are not limited to, policy number, name insured, policy period, limits of insurance, general aggregate limit, products-completed operations aggregate limit, occurrence limit, personal and advertising injury limit.

Optionally, each of the data element in a given sample document is compared with the primary data elements by normalizing the data element. In this regard, a given data element in a given sample document may be normalized as per a given primary data element to make the two data elements comparable to each other. As an example, the given data element present in the given sample document may be normalized by making all letters to lowercase, removing extra spaces, removing punctuation marks, or similar. Optionally, the alphabetical characters or alphanumeric characters comprising the given data element may be compared using a comparison method known in the art. Examples of the comparison method include, but are not limited to, a two-way comparison and a three-way comparison. Advantageously, the technical benefit of defining the primary data elements and comparing the plurality of data elements with the primary data elements is that the key entity fields in the given sample documents can be accurately and easily extracted.

Next, upon classifying the plurality of data elements into the key entity fields and the key field values, the key entity fields having the hierarchical relationship therebetween are identified. In other words, upon classification, the classified key entity fields which are arranged in the hierarchical manner with respect to one another in the given sample document are identified. It will be appreciated that the key entity fields which are not hierarchically linked with each other are not processed further using the method. Referring to the first example, in the policy document, limits of insurance, general aggregate limit, products-completed operations aggregate limit, occurrence limit may be hierarchically linked to one another, therefore may be considered as the identified key entity fields. In the same example, the key entity fields such as policy number, name insured, policy period may not be hierarchically linked to one another, therefore may not be considered as the identified key entity fields.

Upon identifying the key entity fields, each of the key entity field is paired with a corresponding hierarchically linked key field value or a hierarchically linked identified key entity field in the given sample document to form the training dataset. The term "textual modality" refers to textual features in the training dataset for which the neural network framework is trained. Optionally, the textual features include key entity fields and the key field values, representing the information present in a given sample document. The term "visual modality" refers to visual features in the raining dataset for which the neural network framework is trained. Examples of the visual features include, but are not limited to, indentation of a given key entity field with respect to a previous key entity field, position of the key field values, font size of the key entity fields and the key field values, font type of the key entity fields and the key field values, and colour of the key entity fields and the key field values.

The training dataset may include input data and output data with requisite metadata (for example, such as in form of sample documents having hierarchically linked plurality of data elements) to be fed to the neural network framework for training. Such a manner of training the neural network framework using the training dataset is referred to as a supervised learning of the neural network framework, and is well-known in the art. It will be appreciated that optionally when training the neural network framework using the training dataset, the method further comprises employing at least one ML algorithm. The at least one ML algorithm receives and analyses the input data and the output data constituting the training dataset to infer at least one learning function which maps the input data to the output data. An example of the neural network framework is a transformer model.

Optionally, the hierarchical relationship is a parent and child relationship. In this regard, the parent and child relationship refers to a manner in which the plurality of data elements are arranged. The term "parent" refers to a heading in a document and the term "child" refers to a sub-heading under the heading in the document. The given sample document may have multiple parents and multiple children. Optionally, the child has further sub-headings which are considered as grandchild to the parent. Referring to the first example, the limits of insurance may be a parent. General aggregate limit, products-completed operations aggregate limit, and occurrence limit may be child to the limits of insurance. Further, in the same example, damage to premises rented and medical expanse limit may be child to the occurrence limit and said entity field may be grandchild to the limits of insurance.

Optionally, the parent and child relationship is defined, between the paired key entity field with one of the corresponding key field value or the identified key entity field, based on a visual precedence or a visual hierarchical indentation, respectively. In this regard, the term "precedence" refers to positioning of the key field value with respect to the key entity field. Optionally, the precedence may be determined by identifying a visual relationship between the plurality of data elements. Optionally, the visual relationship between the key entity fields and the key field values is determined by identifying proximity of the key entity field with the key field value. As an example, a given key field value may be fixedly spaced with respect to a given key entity field.

Optionally, the visual hierarchical indentation is determined by analyzing hierarchy in the dynamic nested tree by identifying visual cues. The visual may cues indicate the hierarchical relationship between the plurality of data elements of the dynamic nested tree. Optionally, the visual cues may include, but are not limited to, layout, relative positional pattern between data elements, font size, font type, color, and boldness of characters. As an example, the font size of the key entity field at a higher level may have the font size of 16 and the font size of the key entity field at a lower level may be 14. Advantageously, the technical effect of defining the parent child relationship based on the visual precedence or the visual hierarchical indentation is that the paired key entity field can be accurately linked with one of the corresponding key field value or the identified key entity field in less time without overburdening computing resources.

Optionally, the parent and child relationship is defined by offsetting the paired key entity field with one of the corresponding key field value or the identified key entity field, wherein offsetting the paired key entity field with one of the corresponding key field value or the identified key entity field allows the paired key entity field, the corresponding key field value and the identified key entity field to attain a fixed position in the sample documents. In this regard, the term "offsetting" as used herein refers to positioning of a given data element with respect to a fixed position on a given sample document. Each of the given key entity field and a given key field value is assigned a fixed position on the given sample document. Optionally, offsetting is performed by making distinctions amongst the plurality of data elements in the given sample document. As an example, a sample document having multiple columns, each column may be offset from the other columns by a certain margin or width. As another example, in the dynamic nested tree of contents, different levels of headings may be offset from each other by indenting them further than a previous level. Optionally, the paired key entity field is offset at a proximity to the corresponding key field value. In a given sample document, the key entity field such as the policy number is offset at a fixed position and the corresponding key field value such as the corresponding number is offset with respect to the policy number. As an example, the given sample document of A4 size may be divided in multiple blocs of equal sizes, and the policy number may be offset at a position, say for example, between blocks A12 to A14 and the corresponding number may be offset at a position (by leaving for example one block in between) between blocks A16 to A18. Advantageously, the technical effect of offsetting is that the hierarchical relationship amongst the plurality of data elements can be established clearly and can be extracted accurately.

Optionally, the hierarchical relationships between the paired key entity field with one of the corresponding key field value or the identified key entity field is represented using at least one of:
a set of key field values,
a table containing the set of key field values, and
a group of key entity fields along with corresponding set of key field values.

In this regard, in one implementation, hierarchically linked paired entity field and the corresponding key field value and/or the hierarchically linked paired entity field and the corresponding identified key entity field may be represented the set of key field values linked with each other. The set of key field values accurately represent the hierarchical relationship between the plurality of data elements. In another implementation, hierarchically linked paired entity field and the corresponding key field value and/or the hierarchically linked paired entity field and the corresponding identified key entity field may be represented in a form of the table containing the set of key field values linked with each other. In this regard, the plurality of data elements which are hierarchically linked with each other may be represented in the form of the table. Advantageously, the technical effect of this is that the plurality of data elements which are hierarchically linked with each other are represented in a manner such that the hierarchical relationship therebetween can be easily comprehend.

Optionally, the hierarchical relationships between the paired key entity field with one of the corresponding key field value or the identified key entity field is represented by colour coding the set of key field values, and the group of key entity fields. In this regard, optionally, a link between the hierarchical linked paired key entity field and the corresponding key field value and the hierarchically linked paired key entity field and the identified key entity field is color coded with different colors. Optionally, the link between the aforesaid data elements may be represented using a predefined shape. Optionally, the predefined shape include, but are not limited to, a single headed arrow, a double headed arrow, a dash, a single headed dashed arrow, a double headed dashed arrow. Optionally, a color of the shape representing the link between the aforesaid data elements could be color coded in different colors. As an example, the link representing the hierarchical relationships between a paired key entity field with the corresponding key field value may be color coded with blue color and the link representing the hierarchical relationship between the paired key entity field with the identified key entity field may be color coded with pink color. In this way, the multi-level hierarchical relationship data structure of the plurality of data elements in the given sample document can be accurately represented.

It will be appreciated that the color coding is performed only for a set of parent-child in the given sample document. Referring to the above example, a blue color scheme may represent the hierarchical relationship between the limits of insurance and general aggregate limit, the products-completed operations aggregate limit, occurrence limit. In the same example, a pink color scheme may represent the hierarchical relationship between the occurrence limit and medical expanse limit. It will be noted that, in the given example, no color scheme may be utilized to represent the hierarchical relationship between the medical expanse limit and the limits of insurance (as they do not share parent child relationship, and rather are parent and grandchild). Advantageously, the technical effect of color coding is that the hierarchical relationship can be obtained in the plurality of sample documents accurately in a time effective manner, without overburdening the computing resources.

Optionally, identification of the hierarchical relationships in the document enables in comparing the document with another document, and wherein the document is one of a policy, a contract, an agreement, a certificate or a scheme the plurality of data elements comprising a plurality of key entity fields and key field values associated plurality of key entity fields. In this regard, optionally, one document is compared with another document by comparing respective dynamic nested tree in each document. Upon identification of matching dynamic nested tree of the two documents, the key entity fields and the key field values of the two documents are compared. The key entity fields and the key field values at a similar hierarchical level can be compared accurately. Referring to the above example, the value of the general aggregate limit at the parent level of one document may be compared with the value of the general aggregate limit of another document. Advantageously, the technical effect of comparing the two documents is that the two documents can be compared accurately in a time effective manner which significantly reduces effort and time required for businesses which involve processes where comparison of values from one document to another document is required.

The present disclosure also relates to the system for identifying hierarchical relationships between data elements of a document as described above. Various embodiments and variants disclosed above, with respect to the aforementioned first aspect, apply mutatis mutandis to the system for identifying hierarchical relationships between data elements of a document.

The term "processor" refers to a computational element that is operable to respond to and process instructions. Furthermore, the term "processor" may refer to one or more individual processors, processing devices and various elements associated with a processing device that may be shared by other processing devices. Such processors, processing devices and elements may be arranged in various architectures for responding to and executing processing steps.

Optionally, the multi-level hierarchical data structure is a dynamic nested tree, wherein the dynamic nested tree structure comprises one or more levels of hierarchy for one or more key entity fields, and wherein each of the one or more key entity fields hierarchically concludes with a corresponding key field value.

Optionally, the at least one processor extracts the key entity field from the document by:
  receiving a set of primary data elements, and
  comparing the plurality of data elements with each of the set of primary data elements to extract the key entity field.

Optionally, the multi-level hierarchical relationship is a parent and child relationship.

Optionally, the at least one processor is configured to define the parent and child relationship, between the paired key entity field with one of the corresponding key field value or the identified key entity field, based on a visual hierarchical indentation or a visual precedence, respectively.

Optionally, the at least one processor is configured to defined the parent child relationship by offsetting the paired key entity field with one of the corresponding key field value or the identified key entity field, wherein offsetting the paired key entity field with one of the corresponding key field value or the identified key entity field allows the paired key entity field, the corresponding key field value and the identified key entity field to attain a fixed position in the sample documents.

Optionally, the at least one processor is configured to represent the hierarchical relationships between the paired key entity field with one of the corresponding key field value or the identified key entity field by:
  a set of key field values,
  a table containing the set of key field values, and
  a group of key entity fields.

Optionally, the at least one processor is configured to represent the hierarchical relationships between the paired key entity field with one of the corresponding key field value or the identified key entity field by colour coding the set of key field values, and the group of key entity fields.

Optionally, the key entity field comprises one of alphabetical characters, alphanumeric characters, and wherein the key field value comprises alphabetical characters, numerical characters or alphanumeric characters.

Optionally, identification of the hierarchical relationships in the document enables in comparing the document with another document, and wherein the document is one of a policy, a contract, an agreement, a certificate or a scheme the plurality of data elements comprising a plurality of key entity fields and key field values associated plurality of key entity fields.

DETAILED DESCRIPTION OF THE DRAWINGS

Referring to FIG. 1, illustrated are steps of a method for identifying hierarchical relationships between data elements of a document, in accordance with an embodiment of the present disclosure. At step 102, a plurality of sample documents each having a plurality of data elements arranged in a multi-level hierarchical data structure are received. At step 104, each of the plurality of data elements are classified into a key entity field or a key field value based on a hierarchical relationship therebetween. At step 106, key entity fields, from among the classified key entity field of the plurality of data elements having the hierarchical relationship therebetween are identified. At step 108, the key entity field is paired with a corresponding key field value or an identified key entity field, to form a training dataset. At step 110, the training dataset is employed on a neural network framework, having at least one of a textual modality or a visual modality, to identify the hierarchical relationships between the data elements of the document.

Referring to FIG. 2, illustrated is a block diagram of an architecture of a system 200 for identifying hierarchical relationships between data elements of a document, in accordance with an embodiment of the present disclosure. The system 200 comprises at least one processor (depicted for example as a processor 202). The processor 202 may be communicably coupled to a data source 204 to receive a plurality of sample documents.

Figure 3:
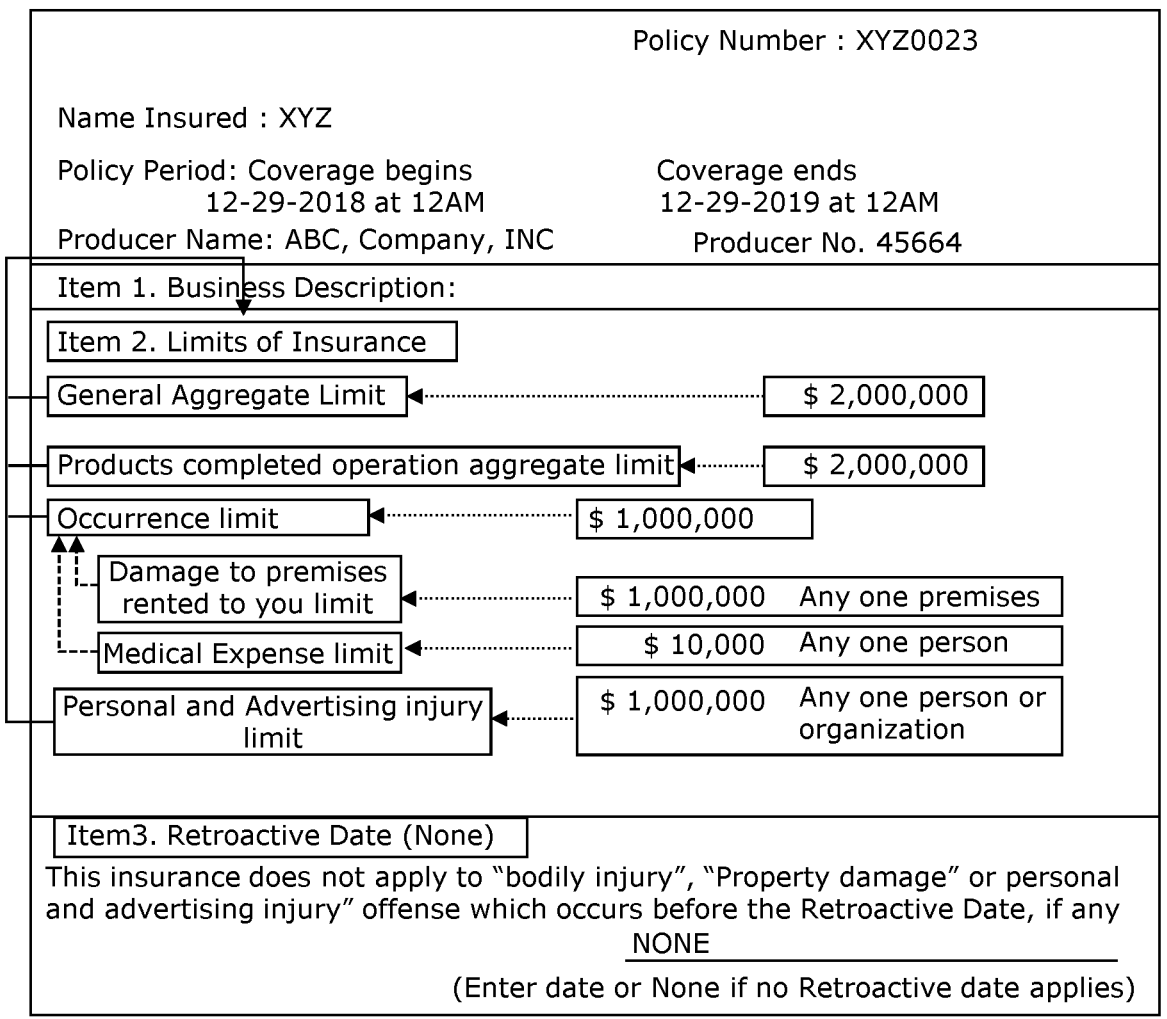
FIG. 3 illustrates an exemplary sample document having a plurality of data elements arranged in a multi-level hierarchical data structure.

Referring to FIG. 3, illustrated is an exemplary sample document 300 having a plurality of data elements arranged in a multi-level hierarchical data structure. In the sample document 300, hierarchical relationship between the data elements which are linked with each other as a parent and a child is represented by different types of arrows. As an example, the hierarchical relationship between key entity field such as general aggregate limit (parent) and corresponding key field value (child) is $2,000,00 is represented by a dotted arrow. As another example, the hierarchical relationship between identified key entity fields such as occurrence limit (parent) and damage to premises rented to you limit (child) is represented by a dashed arrow. As yet another example, the hierarchical relationship between the identified key entity fields such as limits of insurance (parent) and the general aggregate limit (child) is represented by a solid arrow.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A computer-implemented method for identifying multi-level hierarchical relationships between data elements of a document, the method comprising:

receiving, from a data repository, a plurality of sample documents each having a plurality of data elements arranged in a dynamic nested tree representing a multi-level hierarchical data structure;

classifying, by at least one processor, each of the plurality of data elements into a key entity field or a key field value based on a hierarchical relationship between each of the plurality of data elements;

identifying, by the at least one processor, key entity fields, from among the plurality of data elements classified as key entity fields, having the hierarchical relationship therebetween;

pairing, by the at least one processor, key entity fields, with a corresponding key field value or an identified key entity field, to form a training dataset;

defining a parent and child relationship between the paired key entity field and one of the corresponding key field value or the another identified key entity field based on at least one of (i) a visual hierarchical indentation and (ii) a visual precedence, and by offsetting the paired key entity field with one of the corresponding key field value or the another identified key entity field to allow the paired key entity field, the corresponding key field value and the another identified key entity field to attain a fixed position in the sample documents; and employing the training dataset comprising textual features and visual features including indentation of a given key entity field with respect to a previous key entity field, position of the key field values, font size of the key entity fields and the key field values, font type of the key entity fields and the key field values, and colour of the key entity fields and the key field values, for supervised learning of a neural network framework to identify the multi-level hierarchical relationships between the data elements of the document.

2. The method according to claim 1, wherein the multi-level hierarchical data structure is a dynamic nested tree, wherein the dynamic nested tree comprises one or more levels of hierarchy for one or more key entity fields, and wherein each of the one or more key entity fields hierarchically concludes with a corresponding key field value.

3. The method according to claim 1, wherein the key entity field is extracted from the document by:

defining a set of primary data elements, and comparing the plurality of data elements with each of the set of primary data elements to extract the key entity field.

4. The method according to claim 1, wherein the hierarchical relationship is a parent and child relationship.

5. The method according to claim 4, wherein the parent and child relationship is defined, between the paired key entity field with one of the corresponding key field value or the identified key entity field, based on a visual precedence or a visual hierarchical indentation, respectively.

6. The method according to claim 3, wherein the parent and child relationship is defined by offsetting the paired key entity field with one of the corresponding key field value or the identified key entity field, wherein offsetting the paired key entity field with one of the corresponding key field value or the identified key entity field allows the paired key entity field, the corresponding key field value and the identified key entity field to attain a fixed position in the sample documents.

7. The method according to claim 3, wherein the hierarchical relationships between the paired key entity field with one of the corresponding key field value or the identified key entity field is represented using at least one of:

a set of key field values, a table containing the set of key field values, and a group of key entity fields along with corresponding set of key field values.

8. The method according to claim 1, wherein the hierarchical relationships between the paired key entity field with one of the corresponding key field value or the identified key entity field is represented by colour coding the set of key field values, and the group of key entity fields.

9. The method according to claim 1, wherein the key entity field comprises one of alphabetical characters or alphanumeric characters, and wherein the key field value comprises alphabetical characters, numerical characters or alphanumeric characters.

10. The method according to claim 1, wherein identification of the hierarchical relationships in the document enables in comparing the document with another document, and wherein the document is one of a policy, a contract, an agreement, a certificate or a scheme the plurality of data elements comprising a plurality of key entity fields and key field values associated plurality of key entity fields.

11. A system for identifying multi-level hierarchical relationships between data elements of a document, the system comprising at least one processor configured to:

receive, from a data repository, a plurality of sample documents each having a plurality of data elements arranged in a dynamic nested tree representing a multi-level hierarchical data structure;

classify each of the plurality of data elements into a key entity field or a key field value based on a hierarchical relationship between each of the plurality of data elements;

identify key entity fields, from among the classified key entity field of the plurality of data elements, having the hierarchical relationship therebetween;

pair key entity fields, with a corresponding key field value or an identified key entity field, based on the hierarchical relationship therebetween to form a training dataset;

define, by the at least one processor, a parent and child relationship between the paired key entity field and one of the corresponding key field value or the another identified key entity field based on at least one of (i) a visual hierarchical indentation and (ii) a visual precedence, and by offsetting the paired key entity field with one of the corresponding key field value or the another identified key entity field to allow the paired key entity field, the corresponding key field value and the another identified key entity field to attain a fixed position in the sample documents; and employ the training dataset comprising textual features and visual features including indentation of a given key entity field with respect to a previous key entity field, position of the key field values, font size of the key entity fields and the key field values, font type of the key entity fields and the key field values, and colour of the key entity fields and the key field values, for supervised learning of a neural network framework to identify the multi-level hierarchical relationships between the data elements of the document.

12. The system according to claim 11, wherein the multi-level hierarchical data structure is a dynamic nested tree, wherein the dynamic nested tree structure comprises one or more levels of hierarchy for one or more key entity fields, and wherein each of the one or more key entity fields hierarchically concludes with a corresponding key field value.

13. The system according to claim 11, wherein the at least one processor extracts the key entity field from the document by:

receiving a set of primary data elements, and comparing the plurality of data elements with each of the set of primary data elements to extract the key entity field.

14. The system according to claim 11, wherein the multi-level hierarchical relationship is a parent and child relationship.

15. The system according to claim 14, wherein the at least one processor is configured to define the parent and child relationship, between the paired key entity field with one of the corresponding key field value or the identified key entity field, based on a visual hierarchical indentation or a visual precedence, respectively.

16. The system according to claim 14, wherein the at least one processor is configured to defined the parent child relationship by offsetting the paired key entity field with one of the corresponding key field value or the identified key entity field, wherein offsetting the paired key entity field with one of the corresponding key field value or the identified key entity field allows the paired key entity field, the corresponding key field value and the identified key entity field to attain a fixed position in the sample documents.

17. The system according to claim 11, wherein the at least one processor is configured to represent the hierarchical relationships between the paired key entity field with one of the corresponding key field value or the identified key entity field by:

a set of key field values, a table containing the set of key field values, and a group of key entity fields.

18. A system according to claim 11, wherein the at least one processor is configured to represent the hierarchical relationships between the paired key entity field with one of the corresponding key field value or the identified key entity field by colour coding the set of key field values, and the group of key entity fields.

19. The system according to claim 11, wherein the key entity field comprises one of alphabetical characters, alphanumeric characters, and wherein the key field value comprises alphabetical characters, numerical characters or alphanumeric characters.

20. The system according to claim 11, wherein identification of the hierarchical relationships in the document enables in comparing the document with another document, and wherein the document is one of a policy, a contract, an agreement, a certificate or a scheme the plurality of data elements comprising a plurality of key entity fields and key field values associated plurality of key entity fields.

* * * * *